June 19, 1923.
J. G. CORNELL
LAZY TONGS
Filed June 28, 1922
1,459,656
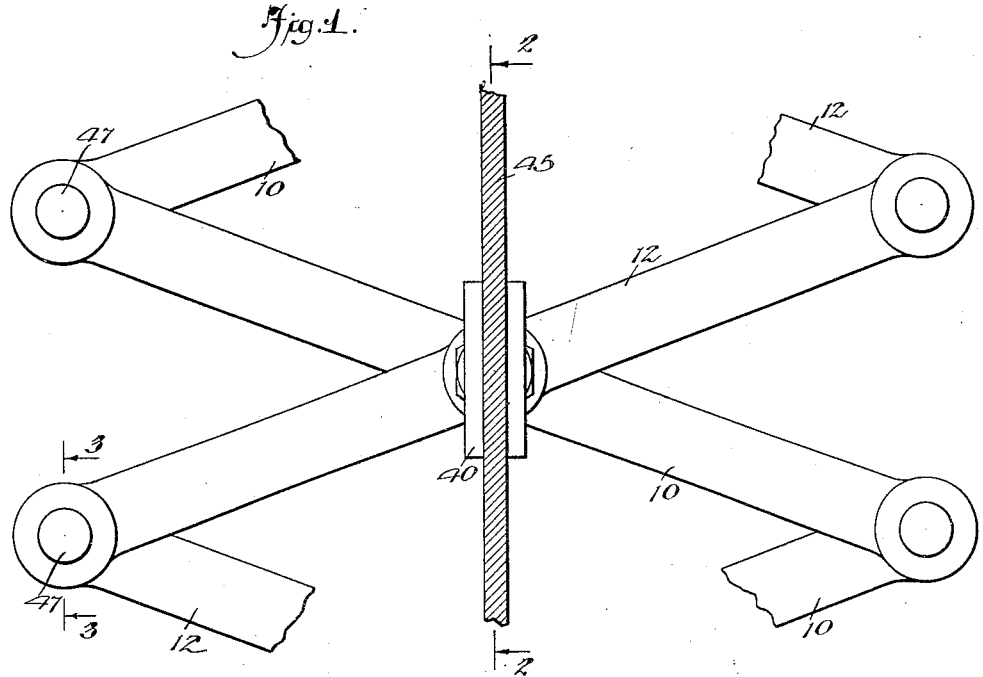
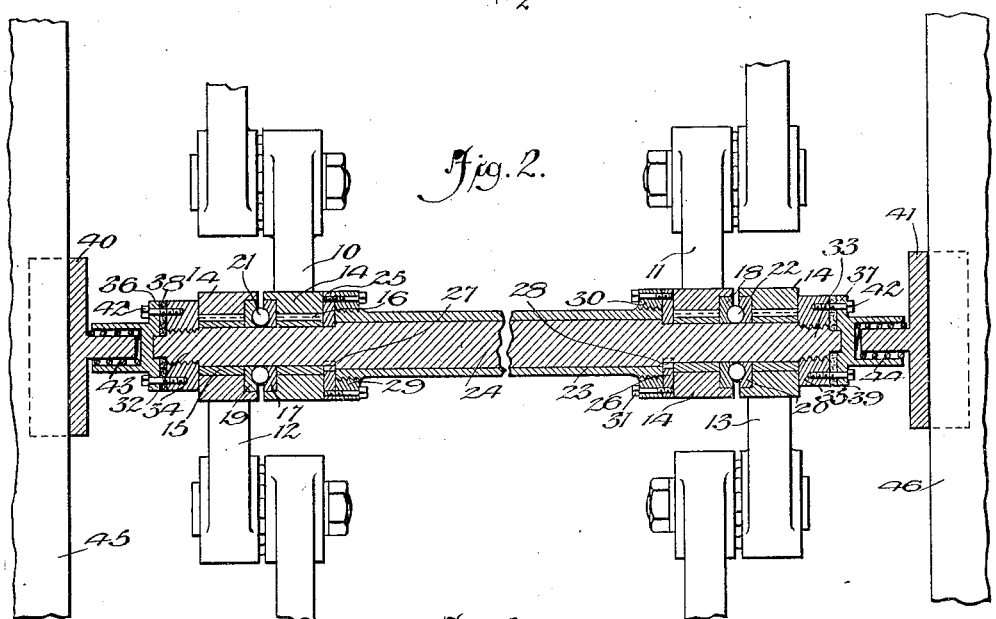
WITNESSES
INVENTOR
Joseph G. Cornell
BY
ATTORNEYS Patented June 19, 1923.

1,459,656

UNITED STATES PATENT OFFICE.

JOSEPH G. CORNELL, OF BROOKLYN, NEW YORK.

LAZY TONGS.

Application filed June 28, 1922. Serial No. 571,402.

*To all whom it may concern:*

Be it known that I, JOSEPH G. CORNELL, a citizen of the United States, and a resident of the city of New York, borough of Brooklyn, in the county of Kings and State of New York, have invented new and useful Improvements in Lazy Tongs, of which the following is a full, clear, and exact description.

This invention relates to the construction of lazy tongs.

The general object of the invention is the provision of simple, efficient and durable mountings for associating different members of the lazy tongs system.

A further object of the invention is the provision of a lazy tongs system, the mountings of which are provided with means for adjusting the members to compensate for wear.

These objects are accomplished by providing a common shaft on which a pair of the bars of each of two sets of bars is rotatably mounted, interposing between the bars of the different pairs a bearing, and mounting on the shaft means for forcing the bars toward one another to compensate for wear.

These and other objects of the invention will be more clearly understood from the following detailed description and accompanying drawings.

Figure 1 is a side elevation of a section of the lazy tongs;

Figure 2 is a section along the line 2—2, Figure 1;

Figure 3 is a section along the line 3—3, Figure 1.

Referring to the above-mentioned drawings which show one embodiment of the invention, two pairs of bars 10, 11 and 12, 13 of two different sets of bars are shown. Formed integral with the center of each bar are hubs 14. Fitted into the hubs 14 and attached thereto by keys 16 are bushings 15. Set into the outer faces of the hubs 14 of the bars 11 are ball raceways 17 and 18, respectively, and set into the inner faces of the hubs 14 of the bars 12 and 13 are ball raceways 19 and 20. The raceways 17 and 19 are located in alinement with one another and contain balls 21, while the raceways 18 and 20, which are also in alinement with one another, hold the balls 22.

The bars 10 to 13, inclusive, are rotatably mounted on the shaft 24. Mounted on the shaft 24 is a sleeve 23 which has both its ends threaded. Fitted onto the shaft and abutting against the ends of the sleeves 23 are two washers 25 and 26. These washers are keyed to the shaft at 27 and 28, and nuts 29 and 30, which make threaded engagement with the ends of the sleeve, abut against the washers, serving to hold them in position. Each of the nuts 29 and 30 and the washers 25 and 26 is provided with a plurality of openings which may be rotated into alinement with one another, and set screws 31 are projected through these openings, attaching the nuts 29 and 30 to the washers 25 and 26, respectively. Thus through the washers the sleeve 23 is attached to the shaft 24.

The ends 32 and 33 of the shaft 24 are threaded and nuts 34 and 35 make threaded engagement with these ends, respectively, serving to retain the bars 12 and 13 in position on the shaft. Caps 36 and 37 provided with cup-shaped ends are attached to the nuts 34 and 35, respectively, by means of the set screws 42. Layers of packing 38 and 39 are interposed between the nuts and caps. The cup-shaped ends formed on the caps 36 and 37 receive the stems of the guiding shoes 40 and 41, respectively. Springs 43 and 44 are mounted in the cups and bear against the shoes 40 and 41, respectively, serving to retain them in engagement with the tracks 45 and 46 and allowing for the movement inward of the caps 37 when the nuts 34 and 35 are tightened on the shaft to compensate for wear in the raceways.

The ends of the bars 10, 11, 12 and 13 are pivotally connected together as shown in Figure 3. As shown in this figure, the ends of the two bars 12 have raceways 52 and 53 set in their inner faces. Balls 56 are mounted in the raceways. Bushings 54 are mounted in one of the members and keyed thereto by means of keys 55. A bolt 47 is projected through the two members and attached to one of them by means of a key 53. A nut 49 and washer 48 are mounted on the end of the bolt and serve to retain the members 12 in position on the same. Keys 50 are provided for fixing the nuts 49 in position on the bolts 47. Thus it will be seen that one of the bars 12 rotates on the bolt 47 while the other is fixed thereto. The ends of the members 10, 11 and 13 are connected together in a similar manner so that they may be rotated about a common axis.

When a lazy tongs system has been constructed with mountings similar to those described above they may be easily adjusted to take up wear, and they are so constructed that the friction resistance operation is very small. In order to adjust the bars on the shaft 24 to compensate for wear of the raceways, the caps 36 and 37 are removed and the nuts 34 and 35 tightened against the hubs 14, forcing them inward. The caps may then be replaced retaining the nuts in position. This tightening does not withdraw the guide shoes from the tracks 45 and 46 since the spring still retains them in engagement with the tracks even after the caps have been moved a certain distance from the tracks. The mounting for connecting the ends of the bars together may be tightened by means of the nuts 49.

I would state in conclusion that while the illustrated example constitutes a practical embodiment of my invention, I do not limit myself strictly to the exact details herein illustrated since manifestly the same may be considerably varied without departing from the spirit of the invention as defined in the appended claims.

Claims.

1. In a lazy tongs system, two sets of bars, one pair of each set being pivoted at their centers to a common shaft, bearings interposed between the bars of the different sets, and means mounted on the shaft for forcing the bars toward one another to compensate for wear.

2. In a lazy tongs system including two sets of bars, a mounting for the centers of the bars comprising a common shaft for one pair of each set of bars, bearings interposed between the bars of the different sets, and means provided in conjunction with the common shaft for forcing the bars toward one another to compensate for wear.

3. In a lazy tongs system including two sets of bars, a mounting for the centers of the bars, a mounting for connecting the ends of the bars of each set, comprising a shaft to which one of the bars is fixed, a bushing fixed in the opening of the other bar and rotatably mounted on the shaft, and a bearing interposed between the bars.

4. A lazy tongs system of the class described, comprising two sets of bars, shafts on which a pair of bars of each set is pivotally mounted at their centers, bearings for interposing between the sets of bars, means for pivotally connecting the ends of the bars of each set, and means associated with the bars for moving them toward one another to compensate for wear.

5. In a lazy tongs system, comprising two sets of bars, a mounting for associating a pair of bars of each set comprising a shaft on which each set of bars is rotatably mounted at their centers, ball bearings for interposing between the bars of the different sets, means for forcing the outer bars inward to compensate for wear, and means carried by the shaft for spacing the inner bars.

6. A lazy tongs system of the class described, comprising two sets of bars having their ends pivotally connected, a pair of each set of bars rotatably mounted on a shaft, bearings interposed between the bars, means for moving the bars toward one another to compensate for wear, and spring-controlled guiding shoes mounted in alinement with said shafts.

7. In a lazy tongs system including two sets of bars, a mounting for connecting the centers of a pair of bars of each set, comprising a shaft on which the bars are rotatably mounted, spacing means mounted on the shaft and interposed between the inner bars, means mounted on the spacing member and adapted to be adjusted for forcing the bars outward to compensate for wear, means mounted on the outer ends of the shaft for forcing the outer bars inward to compensate for wear, and bearings interposed between the bars.

8. A lazy tongs system of the character described, comprising two sets of bars having their ends pivotally connected, a pair of each set of bars rotatably mounted on a common shaft which projects through their centres, spacing members mounted on each shaft, adjustable means mounted on the spacing members for forcing the bars outward to compensate for wear, means mounted on the outer ends of the shafts for forcing the bars inward to compensate for wear, bearings interposed between the bars, and means for guiding the movement of each shaft.

JOSEPH G. CORNELL.